United States Patent [19]

Zucker

[11] 4,288,778

[45] Sep. 8, 1981

[54] ELECTRONIC THEFT PREVENTION APPARATUS FOR VEHICLES

[76] Inventor: Yehuda Zucker, 6 Gan Yavne St., Rishon Le Zion, Israel

[21] Appl. No.: 53,794

[22] Filed: Jul. 2, 1979

[30] Foreign Application Priority Data

Jul. 2, 1978 [IL] Israel ........................................ 55057

[51] Int. Cl.³ ...................... B60R 25/04; B60R 25/10
[52] U.S. Cl. ...................................... 340/64; 340/53; 180/287; 307/10 AT
[58] Field of Search ...................... 340/53, 63, 64, 65; 180/287; 307/10AT

[56] References Cited

U.S. PATENT DOCUMENTS 3,634,880  1/1972  Hawkins .............................. 340/63
3,784,839  1/1974  Weber ............................ 307/10 AT

*Primary Examiner*—Alvin H. Waring
*Attorney, Agent, or Firm*—Sandler & Greenblum

[57] ABSTRACT

Electronic theft prevention apparatus including a decoder integrally formed with a vehicle component and selectively enabling the operation thereof, an encoder accessible to a vehicle operator for providing coded instructions to the decoder to enable operation of the vehicle component, and data coupling apparatus for interconnecting the decoder and the encoder to permit data transfer therebetween.

16 Claims, 7 Drawing Figures

ELECTRONIC THEFT PREVENTION APPARATUS FOR VEHICLES

FIELD OF THE INVENTION

The present invention relates to theft prevention devices and more particularly to electronic theft prevention apparatus for vehicles.

BACKGROUND OF THE INVENTION

Many types of theft prevention apparatus for vehicles are known and presently used. These may be divided into two general categories, mechanical and electronic. The mechanical devices, such as steering wheel or brake locks prevent normal operation of a vehicle but suffer from the disadvantage that they can readily be broken and thus rendered ineffective by the application of a suitable force.

Electrical theft prevention devices, such as ignition switches and concealed electrical switches which interrupt the supply of battery current to the ignition coil and thus to the spark plugs for example, have gained substantial popularity. They too, however, may be overcome by a sufficiently clever thief possessing sufficient knowledge to electrically bypass the electrical switch. For this reason electrical theft prevention devices have not been entirely successful.

While it is acknowledged that it is nearly impossible to prevent theft of a vehicle in all cases, an electronic device which could deter thieves by requiring at least a significant amount of time and a non-trivial amount of skill to be bypassed is certainly needed.

The present invention seeks to provide an electronic theft prevention device for vehicles which overcomes the disadvantages of prior art devices and is not subject to electrical bypass or deactivation merely by means of the application of brute force or the connection of an external bypass wire.

SUMMARY OF THE INVENTION

In accordance with an embodiment of the invention there is provided electronic theft prevention apparatus including a decoder integrally formed with a vehicle component and selectively enabling the operation thereof, an encoder accessible to a vehicle operator for providing coded instructions to the decoder to enable operation of the vehicle component, and data coupling apparatus for interconnecting the decoder and the encoder to permit data transfer therebetween.

Further in accordance with an embodiment of the present invention the encoder and decoder means are both digital devices.

In accordance with a preferred embodiment of the present invention the data coupling means comprises a single conductor which joins the encoder means to the decoder means, both of which are connected to a common ground.

In accordance with embodiments of the invention, the decoder means may be integrally formed with a fuel valve, fuel pump, distributor, ignition coil, or any other component whose operation is essential to operation of the vehicle.

Further in accordance with an embodiment of the invention, the decoder may be incorporated as a subroutine of an ignition controlling microprocessor.

BRIEF DESCRIPTION OF THE DRAWINGS

The invention will be more fully understood and appreciated from the following detailed description taken in conjunction with the drawings in which.

DETAILED DESCRIPTION OF A PREFERRED EMBODIMENT

Figure 1:
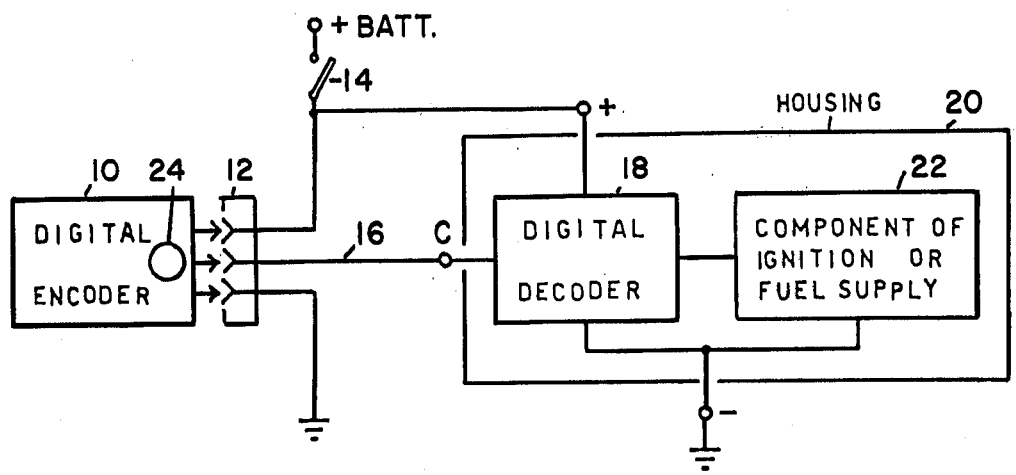
FIG. 1 is a schematic block diagram illustration of a theft prevention device constructed and operative in accordance with an embodiment of the present invention.

Reference is now made to FIG. 1 which schematically illustrates a vehicle theft prevention device constructed and operative in accordance with an embodiment of the present invention. A digital encoder 10, preset to a selected digital code, is removably insertable into engagement with a receptacle 12, such as a conventional three conductor electrical connector.

Of the three conductors, one is connected to ground and a second is connected to the vehicle battery via the vehicle ignition switch 14. A third conductor 16 is connected to a digital decoder 18 formed integrally within a protective housing, indicated schematically by block 20, with a vehicle component 22 such as a part of the ignition or fuel supply systems.

The digital decoder 18 also receives electrical current from the vehicle battery and is operative to supply such current to the vehicle component 22 only in response to receipt of a preset code. Both the digital decoder and the vehicle component 22 are connected to a negative ground.

Exemplary constructions of digital encoder 10 and digital decoder 18 will be described hereinafter in connection with FIGS. 4–6.

In accordance with a preferred embodiment of the present invention, the digital encoder is sufficiently small as to enable it to be carried by an operator together with his ordinary keys. Alternatively it may take the form of a key holder. The receptacle 12 may conveniently be mounted on the dashboard of a vehicle. When the encoder is engaged with the receptacle and the ignition switch is closed, a preset digital code is transmitted by the encoder via a single conductor 16 to the decoder. The vehicle component will receive operating current or will otherwise be activated only if the received code is identical with the code to which the decoder has been preset. Once the correct code has been received, the decoder automatically switches off the encoder as well as an optional signal light 24.

Further in accordance with a preferred embodiment of the invention, the decoder may be constructed to lock itself upon the receipt of an incorrect code, thereby defeating an attempt to try multiple combinations by an unauthorized operator. The decoder may then become unlocked by turning the ignition switch off and then on again. This action is relatively time consuming and renders the application of a large number of combinations in an attempt to randomly arrive at the correct one impractical from a time standpoint.

Additionally in accordance with an embodiment of the present invention, the decoder may be associated with an alarm device which is activated in response to the receipt of an incorrect code.

Both code pulses and synchronization pulses are transmitted to the decoder by the encoder via conductor 16.

The code employed may be a conventional binary code wherein information is expressed in a series of bits which are either "1" or "0" corresponding respectively to a voltage or ground potential or alternatively to a high voltage and low voltage. The maximum number of code combinations is equal to $2^N$ where N is the number of bits in the code. The use of a 10 bit code, for example, provides 1024 combinations with the attendant probability that a randomly chosen code would be correct being less than 0.1%.

Figure 2:
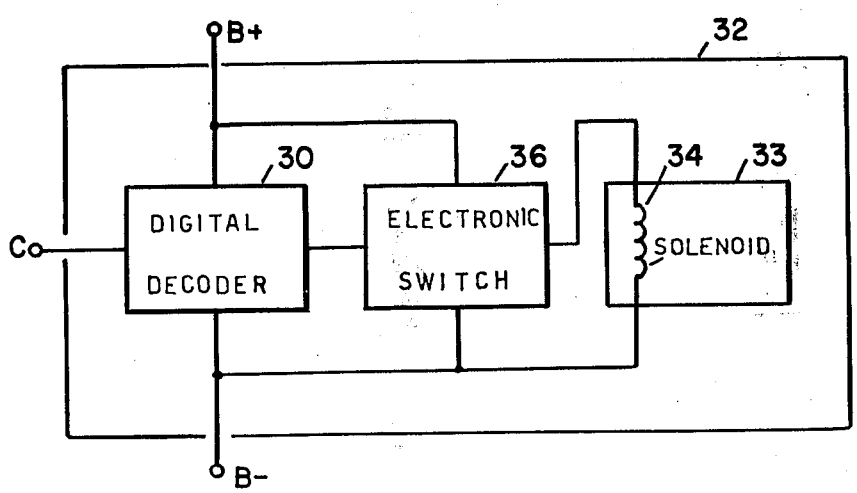
FIG. 2 is a schematic illustration of a vehicle component having a built-in decoder in accordance with an embodiment of the present invention.

Reference is now made to FIG. 2 which illustrates an electrically operated fuel valve integrally formed with a digital decoder 30 within a protective housing indicated schematically by block 32. The valve is operated by a solenoid 34. Valve 33, which is normally closed, is opened when a correct code is received by decoder 30 which is then operative to provide an output signal to an electronic switch 36. Switch 36 is operative in response to the output signal from decoder 30 to activate solenoid 34.

The diagram of FIG. 2 is also applicable to fuel pumps of both the diaphragm type and the rotary type by replacing valve 33 by a pump 33. In the case of the rotary type of fuel pump, solenoid 34 is replaced by a motor. Similarly to the fuel valve, operation of the fuel pump is permitted only when a correct code is received at decoder 30.

Figure 3:
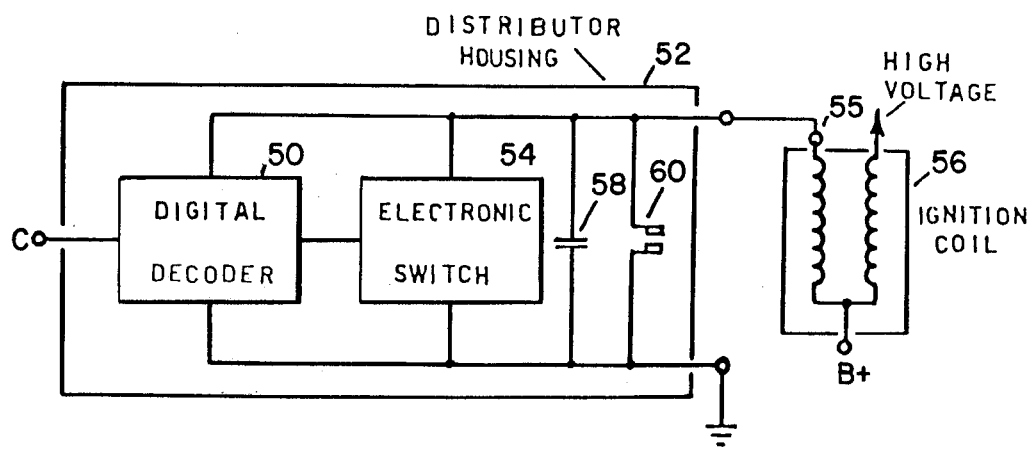
FIG. 3 is a schematic illustration of a distributor having a built-in decoder in accordance with an embodiment of the present invention.

Reference is now made to FIG. 3 which shows a distributor constructed in accordance with an embodiment of the present invention to have an integrally formed digital decoder 50 within the distributor housing 52. Decoder 50 receives a coded message at an input C and in response to a correct code provides an output indication to an electronic switch 54 which is connected between a terminal 55 of the primary of an ignition coil 56, and ground.

As in conventional ignition systems, a capacitor 58 and points 60 are connected between terminal 55 and ground. A spark is generated by a high voltage induced in the secondary winding of the ignition coil each time the current through the primary winding is interrupted by the points. The decoder 50, which is formed as an integral part of the distributor, operates electronic switch 54 in such a way that switch 54 is normally closed in the absence of a received correct code at decoder 50, thus short circuiting the points and producing a continuous current flow through the coil primary with the result that no spark is produced. When a correct code is supplied to decoder 50, switch 54 is opened and the distributor operates normally.

Microprocessor controlled ignition systems for automobiles or other vehicles are presently known. One example is the MISAR system referred to in an article at p. 41 of Chilton's Automotive Industries, Sept. 1, 1976. The present invention can be incorporated in such an ignition system by adding to the microprocessor software a special subroutine designed to recognize a predetermined code and to operate only when such a code is supplied.

Figure 4:
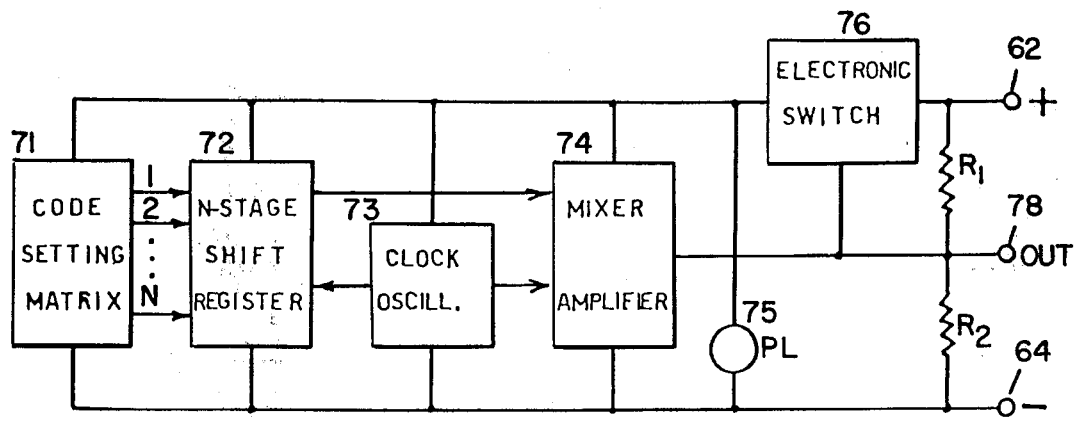
FIG. 4 is a schematic block diagram of an encoder forming part of the theft prevention device constructed and operative in accordance with an embodiment of the present invention.

Reference is now made to FIG. 4 which illustrates in schematic block diagram form an encoder useful in the embodiment of the invention illustrated in FIG. 1. Battery voltage is applied across respective positive and negative terminals 62 and 64, across which are connected in series resistors R 1 and R 2. At the junction of resistors R 1 and R 2 there appears a voltage which is sufficiently high to operate an electronic switch 76 so as to supply power to the various circuits of the encoder and to a pilot lamp 75.

A code setting matrix 71 comprises a network with N outputs, each of which can be connected selectively during code setting either to the positive or negative terminals 62 or 64 respectively, thus generating an N-bit combination of "1"s and "0"s. Such code setting is normally done during manufacture of the encoder and is thus permanent. Alternatively, a changeable code encoder could also be provided.

The outputs of matrix 71 are connected to parallel inputs of an N-stage parallel input/serial output shift register 72. This type of register is operative to receive data in all stages simultaneously and to read out stage by stage at a single output terminal. The register accommodates N bits corresponding to the contents of matrix 71. A clock oscillator 73 determines the readout rate of shift register 72.

A single stage transistor mixer-amplifier 74 receives the output of shift register 72 as well as clock pulses from oscillator 73 and is operative to superimpose the clock pulses on the data output of register 72, thereby providing at an encoder output terminal 78 a composite signal suitable for single wire transmission to the decoder.

The encoder is operative to transmit its code so long as battery voltage is applied across terminals 62 and 64 producing a desired D.C. bias voltage at output terminal 78 which is connected to the junction of resistors R 1 and R 2. It is a particular feature of the present invention that when a correct code is received by the decoder a special circuit in the decoder, to be described in detail hereinafter, reduces the bias voltage to nearly zero, thus automatically switching off the encoder and pilot lamp 75.

Figure 5:
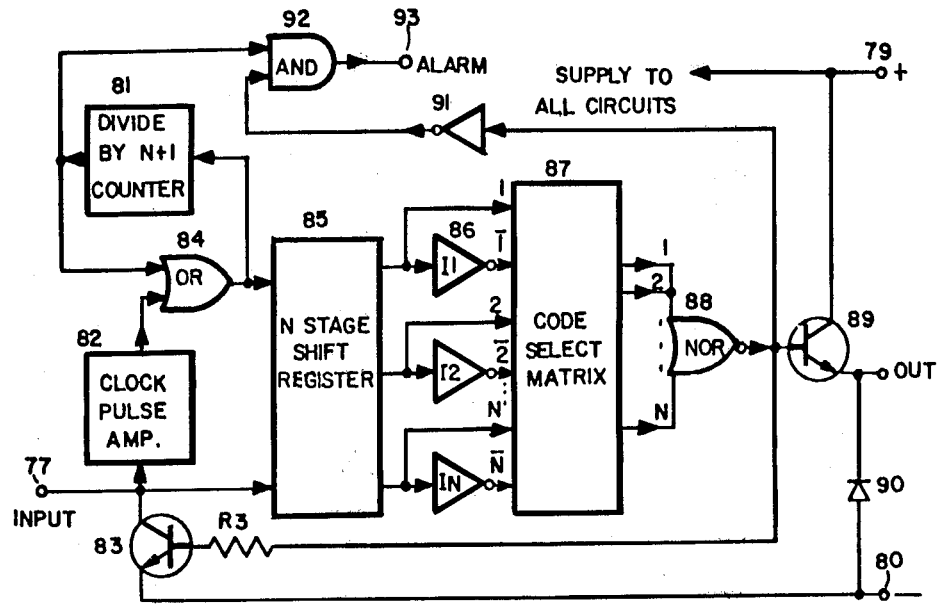
FIG. 5 is a schematic block diagram of a decoder forming part of the theft prevention device constructed and operative in accordance with an embodiment of the present invention.

Reference is now made to FIG. 5 which illustrates in schematic block diagram form a decoder useful in the embodiment of FIG. 1 and in association with the encoder described hereinabove with reference to FIG. 4. Battery voltage is received across terminals 79 and 80. A charging capacitor (not shown) is coupled to input terminals 79 and 80 and provides a reset input to an N stage shift register 85 and to a Divide by N+1 counter 81, thus resetting register 85 and counter 81 to zero, each time battery voltage is applied to terminals 79 and 80.

Input data is received from the output 78 of the encoder at an input terminal 77 and is supplied to a clock pulse amplifier 82 and to shift register 85. Amplifier 82 is a single stage transistor amplifier which amplifies low amplitude input clock pulses received from the encoder to a level compatible with the requirements of shift register 85 that high amplitude pulses be received for proper operation thereof.

Amplified clock pulses from amplifier 82 are supplied via an OR gate 84 to the clock input of shift register 85. A second input of OR gate 84 receives the output of Divide by N+1 counter 81 to provide a locking circuit which prevents attempts to systematically apply all possible combinations to the input 77 until the correct code is found. The operation of this locking circuit will now briefly be described.

When counter 81 is reset by application of battery voltage across terminals 79 and 80 its output is "0" and thus the output of OR gate 84 follows the output of the clock amplifier 82, with the result that clock pulses appear at the clock inputs of shift register 85 and counter 81. After N clock pulses are received, the output of the counter 81 becomes "1" and forces the output of OR gate 84 to be "1" irrespective of the clock amplifier 82 output. Thus the shift register 85 receives no more clock pulses and is "insulated" from application of data from the encoder. This situation continues until the shift register 85 and counter 81 are reset to zero by switching off and then reapplying the battery voltage.

Shift register 85 is of the serial input/parallel output type wherein data is read in sequentially bit by bit and stored in its N stages so as to be available for processing. An array of N inverters, $I_1$-$I_N$ referred to collectively by reference number 86 receives respective outputs from the N stages of shift register 85 and provides the complement of each stored bit so that 2N outputs, comprising N bits and their complements, are supplied to a code selecting matrix 87.

Code selecting matrix 87 determines a preset code by selecting whether the true output of each bit or its complement is connected to the respective inputs of a NOR gate 88. The output of NOR gate 88 is "1" (high voltage) only when all of its inputs are "0". Thus for each presetting of matrix 87 there is only one digital code, among $2^N$ possibilities, fulfilling this condition.

When the output of the NOR gate 88 is "1", indicating receipt of a correct code, transistors 83 and 89 are switched on. Transistor 89 connects the battery voltage at terminal 79 to a load, such as a solenoid or motor, whose operation is governed by the theft prevention apparatus of the present invention. A diode 90 is employed as an inductive transient absorber. When turned "on", transistor 83 shorts the input terminal 77 to terminal 80. It is therefore effective to reduce the bias voltage at encoder output terminal 78, which is connected to terminal 77, to nearly zero, thus switching the encoder and pilot lamp 75 off once the correct code is received.

An inverter 91 receives the output of NOR gate 88 and supplies it to one terminal of an AND gate 92. AND gate 92 also receives an input from the output of counter 81 and provides an alarm output at a terminal 93. Inverter 91 and AND gate 92 thus provide an incorrect code alarm. When a correct code is received by the decoder the outputs of counter 81 and NOR gate 88 are both "1". The output of inverter 91 is therefore "0" and no alarm output will be provided. When an incorrect code is received, the output of NOR gate 88 is "0" and the output of inverter 91 is thus "1" so that a high voltage appears at the output of AND gate 92 for operation of an alarm such as an audio alarm.

Figure 6:
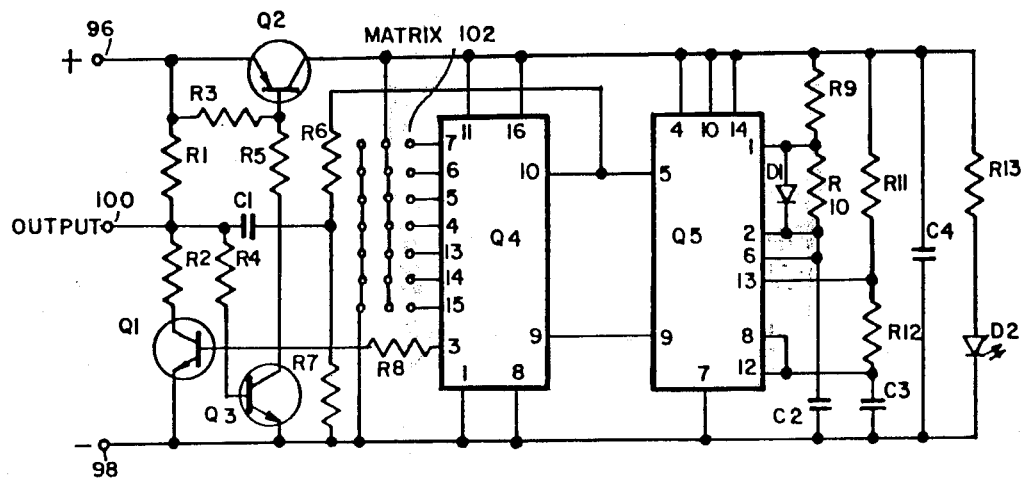
FIG. 6 is a schematic circuit diagram of a preferred embodiment of an encoder of the type illustrated in FIG. 4.

Reference is now made to FIG. 6 which is a schematic circuit diagram of a preferred embodiment of an encoder of the type illustrated generally in FIG. 4. A battery voltage is applied across respective positive and negative terminals 96 and 98. Series connected resistors R 1 and R 2 are connected between terminal 96 and the collector of a transistor Q 1, whose emitter is connected to terminal 98. Resistors R 1 and R 2 correspond to resistors R 1 and R 2 in the block diagram of FIG. 4. Resistors R 1 and R 2 are selected such that even when transistor Q 1 is in saturation, a predetermined DC voltage is present at an output terminal 100 connected to the junction of the two resistors. The DC voltage at output terminal 100 is connected via a resistor R 4 to the base of a transistor Q 3 for turning on transistor Q 3.

Since the collector of transistor Q 3 is connected to the base of a transistor Q 2 via a resistor R 5, when Q 3 is turned on, it supplies base current to transistor Q 2, turning it on, such that nearly full battery voltage is supplied to the encoder circuit via transistor Q 2.

An 8-bit parallel input/serial output shift register Q 4, such as a CD 4014 or its equivalent has its 8 inputs connected to respective outputs of a code generating matrix 102. Matrix 102 is formed by seven jumper wires whose positions on a printed circuit board determine whether each of the parallel inputs of the shift register Q 4 is connected to either terminal 96 (+) or to terminal 98 (−), thus determining whether the output bit is "1" or "0" respectively.

Shift register Q 4 is switched from parallel to serial by the voltage at its pin 9 (for a CD 4014). When the voltage at pin 9 is high, shift register Q 4 operates in the parallel mode and data can be read into all stages simultaneously. When the voltage at pin 9 is low, the stored data can be read out at pin 3 at a rate determined by the clock pulses which are received at a clock input, (pin 10).

Two separate oscillators are employed in this encoder; one of which serves as a master clock for the system and the other provides parallel/serial switching of the shift register Q 4. Both oscillators are implemented with a dual timer Q 5 of the 556 type using conventional circuitry. The components of the master clock are resistors R 9, R 10, capacitor C 2, and diode D 1.

Diode D 1 is employed to provide a relatively short charging time and a relatively long discharge time for capacitor C 2 so as to produce short positive pulses.

The switching oscillator comprises resistors R 11, R 12 and capacitor C 3. The junction of resistors R11 and R 12 is connected to pin 13 of timer Q 5. The outputs of the master clock and parallel/serial switching oscillator are at pins 5 and 9 respectively of timer Q 5. The frequency of the parallel/serial oscillator is much lower than that of the master clock so that at least N clock pulses elapse during one-half period of the parallel/serial oscillator. When power is applied to the encoder, the output of the parallel/serial oscillator (Pin 9 of timer Q 5) is high so that the parallel inputs of shift register Q 4 can receive the code generated by the matrix 102. After one-half oscillator period the voltage at pin 9 of timer Q 5 becomes low and due to the connection between pin 9 of timer Q 5 and pin 9 of shift register Q 4, shift register Q 4 is shifted to the serial mode. The contents of shift register Q 4 then appear, bit by bit, at pin 3 of the shift register, which is connected via a resistor R 8 to the base of transistor Q 1. The output at pin 3 of shift register Q 4 thus drives transistor Q 1 to produce an inverted replica of the code data at output terminal 100.

Master clock pulses are attenuated by a a voltage divider comprising resistors R 6 and R 7, connected between the junction of pin 10 of Q 4 and pin 5 of Q 5, and terminal 98. A capacitor C 1 couples the junction of resistors R 6 and R 7 to output terminal 100.

The input to the 8'th stage of shift register Q 4 (pin 1) is connected to negative terminal 98 in order that at the output it will always be "1", due to inversion by transistor Q 1. This enables a simple and economical solution to the locking circuit in the decoder.

A light-emitting diode D 2 is employed as a pilot lamp and is connected in series with a resistor R 13 between terminals 96 and 98. When a correct code is received by the decoder, the decoder is operative to short the encoder's output terminal 100 to a negative battery voltage terminal, thus switching off transistors Q 3 and Q 2, shift register Q 4 and timer Q 5 as well as LED D 2.

Figure 7:
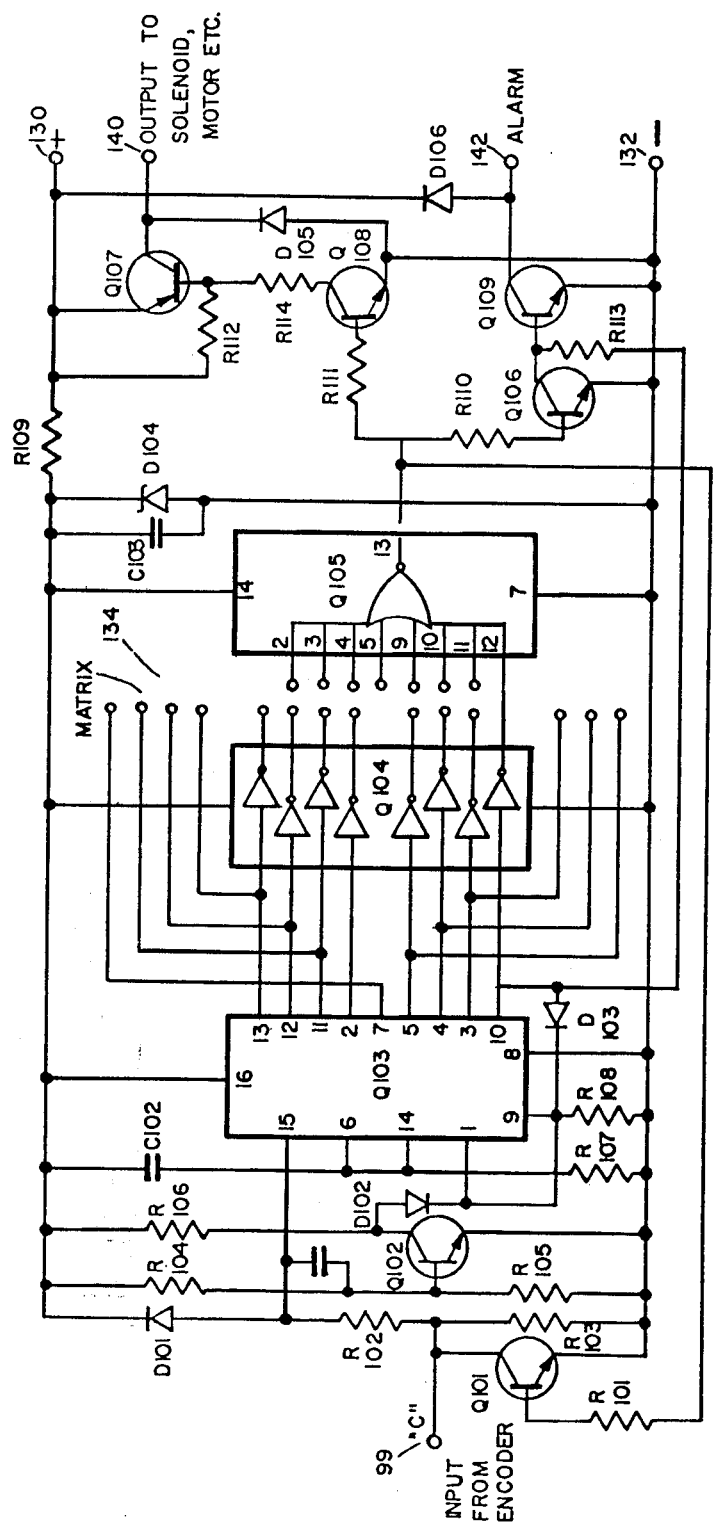
FIG. 7 is a schematic circuit diagram of a preferred embodiment of a decoder of the type illustrated in FIG. 5.

Reference is now made to FIG. 7 which is a schematic circuit diagram of a preferred embodiment of a decoder of the type illustrated generally in FIG. 5. Data and clock pulses received from output 100 of the encoder appear at an input 99, and are applied via a resistor R 102 to the data input (pin 15) of an 8-stage serial input-parallel output shift register Q 103. Shift register Q 103 is a commercially available device such as a CD 4015 (with registers connected in cascade). Clock pulses, which are superimposed on data pulses but too low in amplitude to drive shift register Q 103 are coupled by a capacitor C 101 to the base of a transistor Q 102. Transistor Q 102, which is biased by resistors R 104 and R 105, amplifies clock pulses to the desired level at the collector, connected via a resistor R 106 to a positive battery voltage terminal 130. Transistor Q 102 supplies the amplified clock pulses via a diode D 102 to the clock inputs (pins 1 and 9) of shift register Q 103. Resistors R 103 and R 102 and diode D 101 which form part of the input circuit of shift register Q 103, provide high voltage protection to the input circuit.

A capacitor C 102 and a resistor R 107 the junction of which is connected to pins 6 and 14 of shift register Q 103 provide an automatic reset to shift register Q 103 when battery voltage is applied to the circuit. The automatic reset is provided by the charging current of capacitor C 102 which generates a high-voltage reset pulse at the reset terminals (Pins 6 and 14) of shift register Q 103.

A resistor R 108 provides a negative return for the clock inputs of shift register Q 103 and is connected between terminal 132 and pin 9 of shift register Q 103. A diode D 103 of polarity as illustrated is connected in series between pin 1 of shift register Q 103 and pin 10 thereof. Diodes D 102 and D 103 together define a simple OR gate which is a part of the locking circuit. The anode of diode D 103 is connected to the output of the 8'th stage of shift register Q 103 (pin 10) as indicated so as to stop clock pulses from entering shift register Q 103, thus locking the circuit when the output at pin 10 is "1".

All of the outputs of shift register Q 103 are inverted by an inverter array Q 104 so that any combination of "1"s and "0"s can be selected by a code selecting matrix 134.

In order to simplify the drawing an octal inverter array Q 104 is illustrated although it is not commercially available. In practice two hex inverters such as model CD 4449 are employed.

A code selecting matrix 134, similarly to the code selecting matrix 102 of the encoder, comprises an array of jumper wires whose positions in the printed circuit board determine whether the true or complement output of each bit from Q 103 is connected to an 8 input NOR gate Q 105. The inverted output of stage 8 of shift register Q 103 is permanently connected to one of the inputs of the NOR gate Q 105 to insure that no output is produced by the NOR gate unless the circuit locks and the code matches the one selected by the code selecting matrix 134.

The output of NOR gate Q 105 will be "1" only when all of its inputs are "0" and it will then switch on a transistor Q 108 by supplying base current thereto via a resistor R 111. Transistor Q 108 is connected via a resistor R 114 to the base of a transistor Q 107 and is operative to switch it on and thus to provide an output voltage to an associated device such as a fuel pump, fuel valve, etc. A resistor R 112 provides a base return from transistor Q 107 to terminal 130 and a diode D 105 is employed to absorb inductive voltage transients and is connected between power output 140 and terminal 132.

When a "1" appears at the output of NOR gate Q 105, transistor Q 101 is also switched on, being supplied with base current via a resistor R 101. When transistor Q 101 is on, it shorts the input terminal 99 to the negative terminal 132, thus switching off the encoder as explained hereinabove.

A transistor 109 provides an alarm output at an output 142 suitable for operating a relay when the circuit is locked with an incorrect code. When a "1" appears at the 8th stage of shift register Q 103 (pin 10) base current is supplied via a resistor R 113 to transistor Q 109, turning it on to produce the alarm.

When a correct code is received, however, "1" will appear at pin 13 of NOR gate Q 105 providing base current via a resistor R 110 to a transistor Q 106 which will then prevent transistor Q 109 from being switched on. A diode D 106 is connected between alarm terminal 142 and terminal 130 and is employed to absorb inductive voltage transients.

A resistor R 109 and a parallel combination of a capacitor C 103 and a Zener diode D 104 are connected between terminal 130 and terminal 132 for preventing damage to the decoder from high and transient voltages from the power supply.

It will be appreciated by persons skilled in the art that the various embodiments specifically discussed herein and shown in the drawings are merely exemplary of the invention and are provided only for the purpose of illustration. The invention is not limited to what has been specifically shown and discussed hereinabove. Rather the scope of the invention is defined only by the claims which follow.

I claim:

1. Vehicle theft prevention apparatus comprising:
   decoder means integrally formed with a vehicle component and selectively enabling the operation thereof;
   encoder means accessible to a vehicle operator for providing coded instructions to the decoder means to enable operation of said vehicle component; and
   data coupling means for interconnecting said decoder means and said encoder means to permit data transfer therebetween, whereby application of a constant battery voltage to said data coupling means is not effective to operate said decoder means.

2. Apparatus according to claim 1 and wherein said encoder and decoder are digital devices.

3. Apparatus according to claim 1 and wherein said data coupling means comprises a single conductor which joins the encoder means to the decoder means.

4. Apparatus according to claim 1 and also comprising alarm means for indicating the application of an incorrect code to said decoder means.

5. Apparatus according to claim 1 and also comprising means for preventing operation of said decoder upon receipt thereby of an incorrect code.

6. Apparatus according to claim 1 and also comprising means for disabling said encoder upon transmission thereby to said decoder of a correct code.

7. Apparatus according to claim 1 and wherein said vehicle component is a fuel valve.

8. Apparatus according to claim 1 and wherein said vehicle component is a fuel pump.

9. Apparatus according to claim 1 and wherein said vehicle component is a distributor.

10. Apparatus according to claim 1 and wherein said vehicle component forms part of an ignition system.

11. Apparatus according to claim 1 and wherein said vehicle component is an ignition coil.

12. Apparatus according to claim 1 and wherein said vehicle component comprises a microprocessor.

13. Apparatus according to claim 1 and wherein comprising a signal light for indicating operation of said apparatus.

14. Apparatus according to claim 1 and wherein said vehicle component comprises a starter relay.

15. Apparatus according to claim 1 and wherein said vehicle component is a pick up coil.

16. Apparatus according to claim 1 and wherein said vehicle component is an electronic module for a distributor.

* * * * *